Patented Feb. 7, 1950

2,496,941

UNITED STATES PATENT OFFICE 2,496,941

N-(DI-SUBSTITUTED THIOCARBAMYL-THIO-METHYLENE) AROMATIC AMINES

Albert F. Hardman, Akron, Ohio, assignor to Wingfoot Corporation, Akron, Ohio, a corporation of Delaware No Drawing. Application February 26, 1945, Serial No. 579,889

11 Claims. (Cl. 260—455)

This invention relates to the preparation of chemical compounds useful in the vulcanization of rubber. More particularly, it pertains to compounds obtained by the interaction of a dialiphatic or similar, equivalent amine, carbon bisulfide, formaldehyde and an aromatic amine. Such compounds are useful as accelerators of the vulcanization of rubber and, when so employed, yield vulcanized rubber products of excellent characteristics.

When, according to the invention, a dialiphatic amine is reacted with carbon bisulfide, formaldehyde and a primary or secondary arylamine, the dialiphatic amine apparently forms a dithiocarbamic acid with the carbon bisulfide, and this compound is then linked through a methylene group to the arylamine. For example, the compound derived from dimethylamine, formaldehyde, carbon bisulfide and diphenylamine seems to conform to the structural formula:

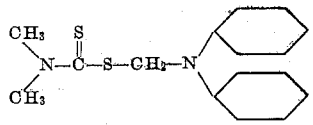

The practice of the invention is illustrated by the following examples:

Example 1

Thirty-six grams of a 25% aqueous solution of dimethylamine and 16 grams of 37% formaldehyde were mixed and stirred, with cooling. Sixteen grams of carbon bisulfide were then added and, after stirring for a few minutes, 19 grams of aniline were added. An oil separated immediately, and, after stirring for a few minutes, began to crystallize. Then 200 cc. of cold water were added and the mixture was stirred rapidly for half an hour, after which the crystals were filtered off, washed and dried. The yield was 43 grams, corresponding to 95% of the theoretical yield, assuming the formula of the product to be:

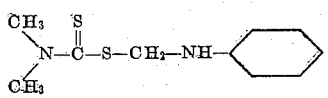

The crude product melted at 82–83° C. Analysis of a recrystallized sample showed a sulfur content of 28.0% and a nitrogen content of 12.2%. The calculated values based upon the above formula are sulfur 28.3% and nitrogen 12.4%.

Example 2

To 90 grams of a 25% aqueous solution of dimethylamine were added 41 grams of 37% formaldehyde, 40 grams of carbon bisulfide and 85 grams of diphenylamine in that order while cooling and stirring. The mixture was then stirred for 7 or 8 hours at room temperature. The heavy oil layer formed was then separated and, to this, 25 cc. of carbon bisulfide were added, and the mixture was refluxed with a water trap until free of water. Excess carbon bisulfide was then evaporated on a steam bath. The liquid residue was allowed to cool and stand for several hours, after which crystals formed. These were pulverized in alcohol, filtered and washed. The yield was 85 grams of white crystals which melted at 93° C. This product is believed to conform to the structural formula:

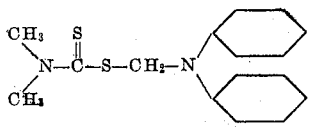

Analysis showed 21.2% sulfur and 9.2% nitrogen. Calculated values, based upon the above formula, are 21.2% sulfur and 9.3% nitrogen.

Example 3

A mixture of 44 grams of phenyl-alpha-naphthylamine, 16 grams of 37% formaldehyde, 36 grams of 25% aqueous dimethylamine, 16 grams of carbon bisulfide and 100 cc. of alcohol was refluxed, with stirring, for one hour and then was allowed to stand for two days. The liquid portion was decanted off and the semi-crystalline, pasty residue was stirred with 100 cc. of fresh alcohol. The crystalline product thus obtained weighed 42 grams. Recrystallized from benzene, it melted at 174° C. Analysis showed 17.8% sulfur and 7.7% nitrogen. The calculated values, based on the structural formula

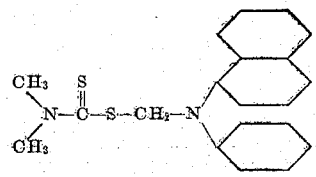

are 18.2% sulfur and 8.0% nitrogen.

Example 4

Thirty-nine grams of N,N'-diphenyl-p-phenylene diamine, 390 cc. of acetone, 90 grams of 25% aqueous dimethylamine, 41 grams of 37% formaldehyde and 40 grams of carbon bisulfide were mixed and the solution formed was stirred at room temperature for eight hours. Crystals began to separate soon after the stirring was started. The mixture stood overnight and 77 grams of crystalline product, melting at 147° C., were obtained. Recrystallized from acetone, the material melted at 154–155° C. Analysis showed that it contained 23.8% sulfur and 10.6% nitrogen. The calculated values, based on the structural formula

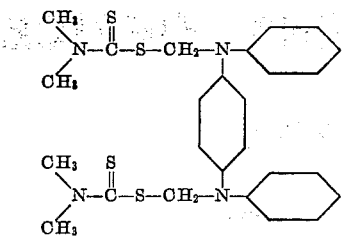

are 24.3% sulfur and 10.6% nitrogen.

*Example 5*

A mixture of 220 grams of phenyl-beta-naphthylamine, 30 grams of paraformaldehyde, 75 grams of diethylamine and 80 grams of carbon bisulfide was stirred, first with cooling and then at room temperature, for eight hours. On standing for two days, the pasty, semi-liquid mass set to a firm, crystalline cake. Recrystallized from acetone, the product melted at 93–94° C. By analysis, it contained 17.2% sulfur and 6.8% nitrogen. The calculated values are 17.5% sulfur and 7.65% nitrogen, based on the formula

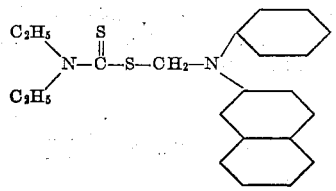

*Example 6*

A mixture of 22 grams of phenyl-beta-naphthylamine, 200 cc. of alcohol, 40 grams of 23.5% aqueous dimethylamine, 20 grams of 37% aqueous formaldehyde and 16 grams of carbon bisulfide was stirred for three hours and allowed to stand at room temperature for two days. The white, crystalline product was filtered off and washed with fresh alcohol. It weighed 32.5 grams and melted at 113° C. The formula is believed to be

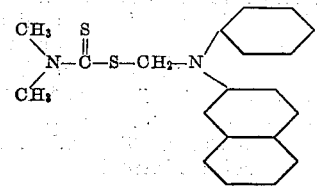

Various other dialiphatic amines may be employed in place of the dimethylamine of the examples, including straight and branched chain, saturated and unsaturated aliphatic amines. Also, in addition to the strictly aliphatic amines, various other amines of aliphatic characteristics may be employed. These include the cycloaliphatic or alicyclic amines. Also included are substituted aliphatic amines containing cyclic substituents, such as aralkylamines, furfurylamines, tetrahydrofurfurylamines and the like. Such amines function in this invention in the same manner as the aliphatic amines and are fully equivalent thereto. Further examples are diethylamine, diisopropylamine, the dibutylamines, N-ethyl isoamylamine, diallylamine, dibenzylamine, N-isobutyl phenethylamine, dicyclohexylamine, piperidine, morpholine, the N-cyclohexyl decahydronaphthylamines, N,N'-dicyclohexyl cyclohexylene diamine, di-alpha-furfurylamine, ditetrahydro-alpha-furfurylamine, N-methyl cyclohexylamine, N-β-cyanoethyl cyclohexylamine, N-benzyl cyclohexylamine, N-alpha-furfuryl cyclohexylamine, N-tetrahydro-alpha-furfuryl cyclohexylamine, N-ethyl alpha-furfurylamine, N-benzyl alpha-furfurylamine, N-octyl tetrahydro-alpha-furfurylamine, N-phenethyl tetrahydro-alpha-furfurylamine, N-alpha-furfuryl tetrahydro-alpha-furfurylamine. The dialkyl amines constitute a preferred type.

Also, various other primary and secondary aryl amines may be employed in place of the specific aromatic amines of the examples, including arylamines having various substituents attached to the aryl ring. Further examples are o-, m-, and p-toluidine, the xylidines, α- and β-naphthylamine, o-, m-, and p-phenylenediamine, the anisidines, the phenetidines, N-phenyl-α-naphthylamine, N-phenyl-β-naphthylamine, N,N'-diphenyl-p-phenylene diamine, o-amino diphenyl benzidine, amino azobenzene, the aminophenols, N-methyl aniline, the N-ethyl toluidines, the N-allyl xylidines, N-cyclohexyl aniline, N-furfuryl-β-naphthylamine, N-benzyl-α-naphthylamine, etc. Also, in addition to those compounds which are strictly amines, one may employ other primary and secondary aromatic amino compounds, such as benzamide, toluene-sulfonamide, ethyl-β-anilino crotonate, ethyl-β-p-hydroxy anilino crotonate, acetanilide, benzene-sulfonamide, etc.

When employed according to the present invention, the primary aromatic amino compounds may react either with one or two proportions of the other ingredients, since the primary amino group has two equally reactive hydrogens. Thus, one mol of aniline will react with one mol each of formaldehyde, carbon bisulfide and dimethylamine to produce a compound having the following structural formula:

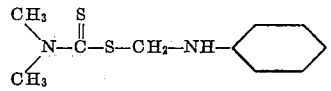

It will be observed that this product still contains a reactive hydrogen and therefore it may be further reacted with an additional mol each of formaldehyde, carbon bisulfide and dimethylamine to produce a compound having the following structural formula:

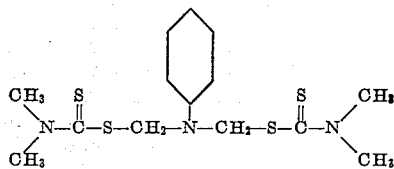

The same result may be achieved alternatively by initially reacting one mol of aniline with two mols each of formaldehyde, carbon bisulfide and dimethylamine. The formation of these respective products will be influenced somewhat by the relative proportions of reactants employed and also by the temperature and time of reaction, somewhat longer times being required for the latter type of compound. Also, if polyamines are employed, each of the amino groups may enter into the reaction, this being true either of the dialiphatic amine or the primary or secondary aromatic amino compound.

The compounds of the invention are very active low temperature accelerators of the vulcanization of rubber, including synthetic rubbers of the types whose cures are accelerated by compounds useful as accelerators of the vulcanization of natural rubber. Very small amounts of the accelerator compounds produce very tight cures in both natural and synthetic rubbers. They are particularly advantageous in the vulcanization of Buna-S type synthetic obtained by copolymerizing butadiene and styrene. The vulcanized products obtained have good physical characteristics and good ageing characteristics.

The compounds derived from diaryl amines, and particularly those derived from the N-phenyl naphthylamines, are especially good from the ageing standpoint.

In order to test the qualities of the accelerators, they were milled into rubber in accordance with the following formula:

| | Parts |
|---|---|
| Smoked sheet rubber | 100 |
| Zinc oxide | 5 |
| Sulfur | 3 |
| Accelerator | As noted |

No antioxidant was added, so that the tests would better indicate the relative influence of the accelerators on ageing.

The products of Examples 1 (hereinafter identified as A) and 6 (hereinafter identified as B) are taken as representative of the materials obtained from primary and secondary arylamines, respectively.

Preliminary tests showed equivalent cures to be produced with 0.15 part of A and 0.25 part of B.

Samples so compounded were tested after vulcanization at 260° F. and again after six days' ageing in an oxygen bomb at 50° C. to yield the following results:

| Time of Cure in Minutes | Before Ageing | | After Ageing | |
|---|---|---|---|---|
| | A | B | A | B |
| Ultimate Tensile in Kgms./sq. cm. | | | | |
| 35 | 2,275 | 2,260 | 2,350 | 2,390 |
| 50 | 2,075 | 2,175 | 2,210 | 2,075 |
| 70 | 2,050 | 2,000 | 1,600 | 1,855 |
| 100 | 1,975 | 2,000 | 440 | 1,440 |
| 140 | 1,650 | 1,460 | 300 | 1,360 |
| Ultimate Elongation in Per Cent | | | | |
| 35 | 755 | 753 | 725 | 735 |
| 50 | 765 | 770 | 730 | 730 |
| 70 | 780 | 770 | 710 | 735 |
| 100 | 790 | 795 | 515 | 715 |
| 140 | 780 | 765 | 420 | 720 |
| Tensile Strength at 700% Elongation | | | | |
| 35 | 1,675 | 1,625 | 1,990 | 2,000 |
| 50 | 1,420 | 1,645 | 1,770 | 1,750 |
| 70 | 1,230 | 1,250 | 1,450 | 1,435 |
| 100 | 1,110 | 1,060 | ----- | 1,310 |
| 140 | 990 | 950 | ----- | 1,200 |

The percent gain in weight of the samples on ageing was as follows:

| Time of cure | A | B |
|---|---|---|
| 35 | 0.162 | 0.119 |
| 50 | 0.195 | 0.203 |
| 70 | 0.470 | 0.287 |
| 100 | 0.966 | 0.655 |
| 140 | 0.937 | 0.475 |

These data demonstrate clearly that the use of compound B produces vulcanized rubber which is definitely superior in ageing characteristics to vulcanized rubber obtained with compound A.

This application is a continuation in part of my co-pending application Serial No. 483,164, filed April 15, 1943, now abandoned.

I claim:

1. A process for preparing an N-(disubstituted thiocarbamyl-thio-methylene) aromatic amine which comprises reacting a mixture of formaldehyde, carbon bisulfide, a compound selected from the group consisting of primary and secondary aromatic amines, and a secondary amine having the structural formula $R_1$—NH—$R_2$, in which $R_1$ and $R_2$ are selected from the group consisting of aliphatic, cycloaliphatic, aralkyl, furfuryl and tetrahydrofurfuryl radicals.

2. A process for preparing an N-(dialiphatic thiocarbamyl-thio-methylene) aromatic amine which comprises reacting a mixture of a dialiphatic amine, formaldehyde, carbon bisulfide and a compound selected from the group conisting of primary and secondary aromatic amines.

3. A process for preparing an N-(dialiphatic thiocarbamyl-thio-methylene) aromatic amine which comprises reacting a mixture of a dialiphatic amine, formaldehyde, carbon bisulfide and a primary aromatic amine.

4. A process for preparing an N-(dialiphatic thiocarbamyl-thio-methylene) aromatic amine which comprises reacting a mixture of a dialiphatic amine, formaldehyde, carbon bisulfide and a secondary aromatic amine.

5. A process for preparing an N-(dialkyl thiothiocarbamyl-thio-methylene) arylamine which comprises reacting a mixture of a dialkylamine, formaldehyde, carbon bisulfide and a primary arylamine.

6. A process for preparing an N-(dialkyl thiocarbamyl-thio-methylene) arylamine which comprises reacting a mixture of a dialkylamine, formaldehyde, carbon bisulfide and a secondary diarylamine.

7. A process for preparing N-(diethyl thiocarbamyl - thio-methylene)-N-phenyl-$\beta$-naphthylamine which comprises reacting a mixture of diethylamine, formaldehyde, carbon bisulfide and N-phenyl-$\beta$-naphthylamine.

8. A process for preparing N-(dimethyl thiocarbamyl _ thio-methylene)-N-phenyl-$\beta$-naphthylamine, which comprises reacting a mixture of dimethylamine, formaldehyde, carbon bisulfide and N-phenyl-$\beta$-naphthylamine.

9. As new compositions of matter, the N-(dialkyl thiocarbamyl _ thio-methylene)-N-phenyl naphthylamines.

10. As a new composition of matter, N-(diethyl thiocarbamyl-thio-methylene)-N-phenyl-$\beta$-naphthylamine.

11. As a new composition of matter, N-(dimethyl thiocarbamyl - thio - methylene)-N-phenyl-$\beta$-naphthylamine.

ALBERT F. HARDMAN.

REFERENCES CITED

The following references are of record in the file of this patent:

UNITED STATES PATENTS

| Number | Name | Date |
|---|---|---|
| 2,177,547 | Jones | Oct. 24, 1939 |
| 2,177,548 | Jones | Oct. 24, 1939 |
| 2,226,984 | Sloan | Dec. 31, 1940 |
| 2,248,356 | Jones | July 8, 1941 |
| 2,260,380 | Jones | Oct. 28, 1941 |
| 2,323,940 | Sloan | July 13, 1943 |
| 2,325,720 | Urbschat | Aug. 3, 1943 |
| 2,356,163 | Jones | Aug. 22, 1944 |
| 2,358,715 | Jones | Sept. 19, 1944 |

Certificate of Correction

February 7, 1950

Patent No. 2,496,941

ALBERT F. HARDMAN

It is hereby certified that errors appear in the printed specification of the above numbered patent requiring correction as follows:

Column 6, line 18, for "conisting" read *consisting*; line 30, strike out "thio-"; and that the said Letters Patent should be read with these corrections therein that the same may conform to the record of the case in the Patent Office.

Signed and sealed this 30th day of May, A. D. 1950.

[SEAL]

THOMAS F. MURPHY,
*Assistant Commissioner of Patents.*